(12) United States Patent
Nomura et al.

(10) Patent No.: US 11,250,029 B2
(45) Date of Patent: Feb. 15, 2022

(54) INFORMATION PROCESSING SYSTEM AND CLASSIFICATION METHOD

(71) Applicant: NEC Corporation, Tokyo (JP)

(72) Inventors: Takashi Nomura, Tokyo (JP); Koji Kida, Tokyo (JP); Kazuhiko Isoyama, Tokyo (JP); Junpei Kamimura, Tokyo (JP); Yoshiaki Sakae, Tokyo (JP); Yuji Kobayashi, Tokyo (JP); Etsuko Ichihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 161 days.

(21) Appl. No.: 15/521,214

(22) PCT Filed: Oct. 28, 2015

(86) PCT No.: PCT/JP2015/005425
§ 371 (c)(1),
(2) Date: Apr. 21, 2017

(87) PCT Pub. No.: WO2016/067612
PCT Pub. Date: May 6, 2016

(65) Prior Publication Data
US 2018/0018384 A1      Jan. 18, 2018

(30) Foreign Application Priority Data
Oct. 30, 2014   (JP) .............................. JP2014-220922

(51) Int. Cl.
*G06F 16/28*      (2019.01)
(52) U.S. Cl.
CPC .................................. *G06F 16/285* (2019.01)

(58) Field of Classification Search
CPC ................................................... G06F 16/285
See application file for complete search history.

(56) References Cited

U.S. PATENT DOCUMENTS 6,675,170 B1    1/2004  Flake
8,494,985 B1 *  7/2013  Keralapura ......... H04L 63/0245
                                                    706/12
(Continued)

FOREIGN PATENT DOCUMENTS

CA    2315413 A1    2/2001
EP    1076299 A2    2/2001
(Continued)

OTHER PUBLICATIONS

International Search Report corresponding to PCT/JP2015/005425, 2 pages, dated Jan. 26, 2016.
(Continued)

*Primary Examiner* — Mark D Featherstone
*Assistant Examiner* — Tony Wu

(57) ABSTRACT

The present invention provides an information processing system for more appropriately classifying elements that constitute an information processing device or the like. This information processing system is provided with: a means that, on the basis of information indicating the relationship between a plurality of elements that constitute a system, acquires, for first elements to be classified, a set of second elements capable of arriving at the first elements via a relationship of arbitrary numbers; and a means that, on the basis of the set corresponding to the first elements, classifies each of the first elements in any of a plurality of roles.

19 Claims, 14 Drawing Sheets

(56) References Cited

U.S. PATENT DOCUMENTS

| | | | |
|---|---|---|---|
| 2006/0025985 A1* | 2/2006 | Vinberg | H04L 67/1002 703/22 |
| 2008/0154816 A1* | 6/2008 | Xiao | G06N 3/02 706/15 |
| 2010/0063611 A1* | 3/2010 | Patel | G05B 23/024 700/108 |
| 2011/0267964 A1* | 11/2011 | Baltatu | H04L 43/00 370/242 |
| 2012/0210423 A1* | 8/2012 | Friedrichs | G06F 21/564 726/22 |

FOREIGN PATENT DOCUMENTS

| | | |
|---|---|---|
| JP | 2001-076010 A | 3/2001 |
| JP | 2006-302135 A | 11/2006 |
| JP | 2008-203964 A | 9/2008 |
| JP | 2010-055381 A | 3/2010 |
| JP | 2012-083849 A | 4/2012 |
| JP | 2013-225251 A | 10/2013 |
| WO | WO-2011/030755 A1 | 3/2011 |

OTHER PUBLICATIONS

Written Opinion of the International Searching Authority corresponding to PCT/JP2015/005425 with English translation, 4 pages, dated Jan. 26, 2016.

Decision to Grant a Patent with English translation, JP2014-220922, dated May 31, 2016, 3 pages.

Notification of Reasons for Refusal with English translation, JP2014-220922, dated Oct. 6, 2015, 5 pages.

Shigeyoshi Ohno et al., "Clustering Web Pages Based on Maximum Flow Algorithm", Transactions of Information Processing Society of Japan, Mar. 15, 2006 (Mar. 15, 2006), vol. 47, No. SIG4 (TOD29), pp. 65-75.

Ikuse, Tomonori et al., Malware Download Site Detection Based on Dependencies between Remote Servers and Malware Behavior, CSS2014 Computer security symposium 2014 Collected papers Joint holding Malware measure research personnel training workshop 2014 Information Processing Society of Japan symposium series, Japan, general incorporated foundation Information Processing Society of Japan Computer Security Group, Dec. 24, 2014, the 2014th volume, No. 2, pp. 1134-1141.

* cited by examiner

821 CLASSIFICATION RESULT

| ROLE IDENTIFIER | NODE IDENTIFIER |
|---|---|
| role1 | p1 |
| role1 | p2 |
| role1 | p4 |
| role2 | p3 |
| role2 | p5 |

822 CLASSIFICATION RESULT

| ROLE IDENTIFIER | NODE IDENTIFIER |
|---|---|
| role1 | f2 |
| role1 | f5 |
| role2 | f1 |
| role2 | f3 |
| role2 | f4 |
| role3 | f6 |

823 CLASSIFICATION RESULT

| ROLE IDENTIFIER | NODE IDENTIFIER |
|---|---|
| role1 | a. exe |
| role1 | g. exe |
| role2 | b. exe |
| role2 | f. exe |
| role3 | c. exe |
| role3 | h. exe |
| role4 | d. exe |

INFORMATION PROCESSING SYSTEM AND CLASSIFICATION METHOD

CROSS-REFERENCE TO RELATED APPLICATIONS

This application is a national stage application of International Application No. PCT/JP2015/005425 entitled "INFORMATION PROCESSING SYSTEM AND CLASSIFICATION METHOD," filed on Oct. 28, 2015, which claims the benefit of the priority of Japanese Patent Application No. 2014-220922 filed on Oct. 30, 2014, the disclosures of each of which are hereby incorporated by reference in their entirety.

TECHNICAL FIELD

The present invention relates to a technique for classifying elements that constitute an information processing device or the like.

BACKGROUND ART

There are known various related techniques for classifying elements that constitute an information processing device or the like.

For instance, PTL 1 discloses a technique for analyzing application assets. The technique is a technique for classifying application assets into a plurality of associated sets that are not associated with each other on the basis of an association relationship. The association relationship is a result of analyzing a relationship between a processing unit such as a job and a program, which is included in the application assets, and data (for example, a file) that the processing unit inputs or outputs.

PTL 2 discloses a technique for classifying access rule categories into a plurality of roles. The access rule categories are information for associating permission with a plurality of user IDs (Identifiers). The technique associates access rule categories with role definition names on the basis of a common attribute being common to a plurality of user IDs included in the access rule categories.

CITATION LIST

Patent Literature

PTL 1: Japanese Laid-open Patent Publication No. 2006-302135
PTL 2: International Publication No. WO2011/030755

SUMMARY OF INVENTION

Technical Problem

It is required to classify various types of elements that constitute an information processing device or the like into roles from various aspects.

However, in the techniques described in the aforementioned citation list, there is a problem that types of classifiable elements and aspects of classification are limited to a narrow range.

The reason is as follows.

In the technique of PTL 1, elements to be classified are specialized only to application assets, and aspects of classification are specialized only to the relationship between the processing unit and data.

Further, in the technique of PTL 2, elements to be classified are specialized to access rule categories, and aspects are specialized to the common attribute being common to the plurality of user IDs included in the access rule categories.

An object of the present invention is to provide a technique for classifying elements that constitute an information processing device or the like in an advantageous manner.

Solution to Problem

An information processing system according to one aspect of the present invention includes:
element set acquiring means for acquiring, based on information regarding one or more relationships between a plurality of elements that constitute a system, for each of first elements to be classified, a set of second elements reachable to the first element via an arbitrary number of the relationships, the first elements and the second elements being included in the plurality of elements; and
classifying means for classifying each of the first elements into one of a plurality of roles, based on the set associated with each of the first elements, and outputting a classification result.

A classifying method according to one aspect of the present invention includes:
acquiring, based on information regarding one or more relationships between a plurality of elements that constitute a system, for each of first elements to be classified, a set of second elements reachable to the first element via an arbitrary number of the relationships, the first elements and the second elements being included in the plurality of elements; and
classifying each of the first elements into one of a plurality of roles, based on the set associated with each of the first elements, and outputting a classification result.

A non-transitory computer readable storage medium according to one aspect of the present invention stores a program causing a computer to perform processes of:
acquiring, based on information regarding one or more relationships between a plurality of elements that constitute a system, for each of first elements to be classified, a set of second elements reachable to the first element via an arbitrary number of the relationships, the first elements and the second elements being included in the plurality of elements; and
classifying each of the first elements into one of a plurality of roles, based on the set associated with each of the first elements, and outputting a classification result.

Advantageous Effects of Invention

An advantageous effect of the present invention is that it is possible to classify elements that constitute an information processing device or the like in an advantageous manner.

DESCRIPTION OF EMBODIMENTS

Figure 1:
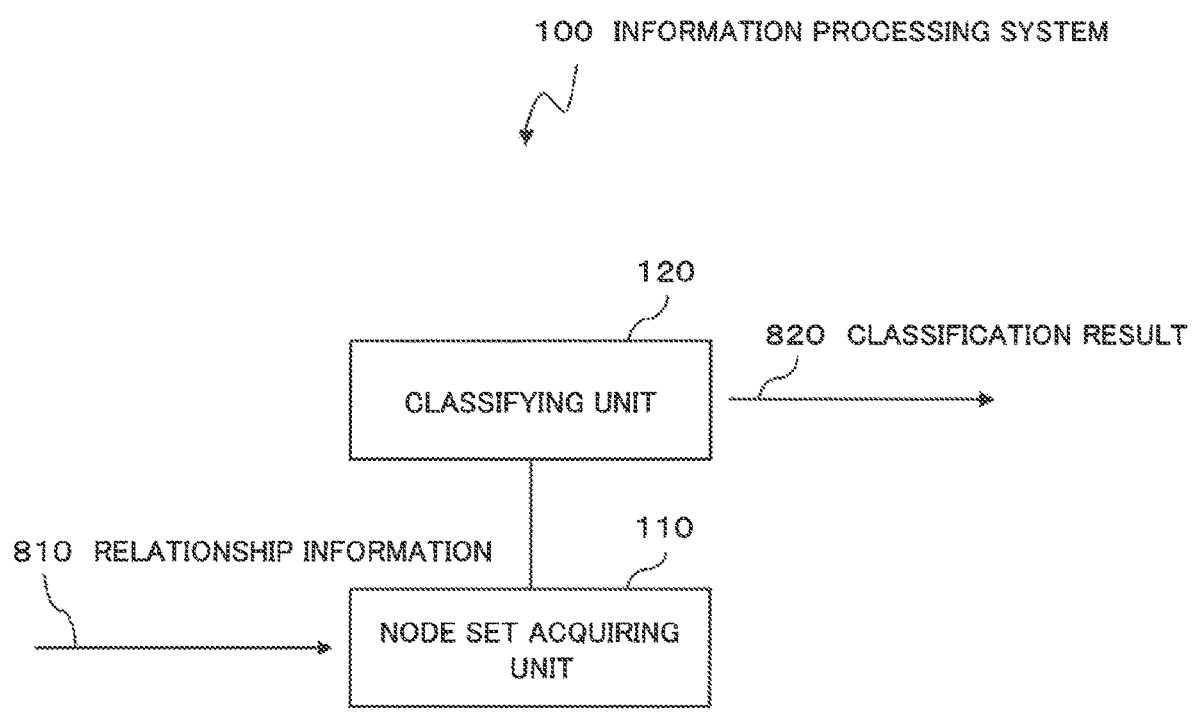
FIG. 1 is a block diagram illustrating a configuration of an information processing system according to a first example embodiment of the present invention.

Example embodiments for implementing the present invention are described in detail referring to the drawings. Note that in the drawings and in the example embodiments described in the description, same constituent elements are indicated by same reference numerals, and description thereof is omitted as necessary. Further, directions of arrows in the drawings indicate an example, and do not limit the directions of signals between blocks.

First Example Embodiment

FIG. 1 is a block diagram illustrating a configuration of an information processing system 100 according to the first example embodiment of the present invention. As illustrated in FIG. 1, the information processing system 100 according to the present example embodiment includes a node set acquiring unit (also referred to as element set acquiring means) 110 and a classifying unit 120.

Each of constituent elements illustrated in FIG. 1 may be a circuit as a hardware unit, a module included in a microchip, or may be one of constituent elements that are divided into functional units of a computer device. In other words, each of the constituent elements illustrated in FIG. 1 may be implemented by a circuit. The circuit may be a circuit as a hardware unit, a module included in a microchip, or a computer. For instance, the circuit may be an LSI (Large Scale Integration) or a PGA (Programmable Gate Array). The LSI or the PGA may be constituted by a single chip, or may be constituted by a multichip. Further, the circuit may be a server, or combination of a server and a local device. In this example, description is made on the basis of an assumption that the constituent elements illustrated in FIG. 1 are constituent elements that are divided into functional units of a computer device. Note that the information processing system 100 illustrated in FIG. 1 may alternatively be implemented in a certain server and usable via a network, or may be usable by installing the constituent elements illustrated in FIG. 1 on a network in a distributed manner.

Figure 2:
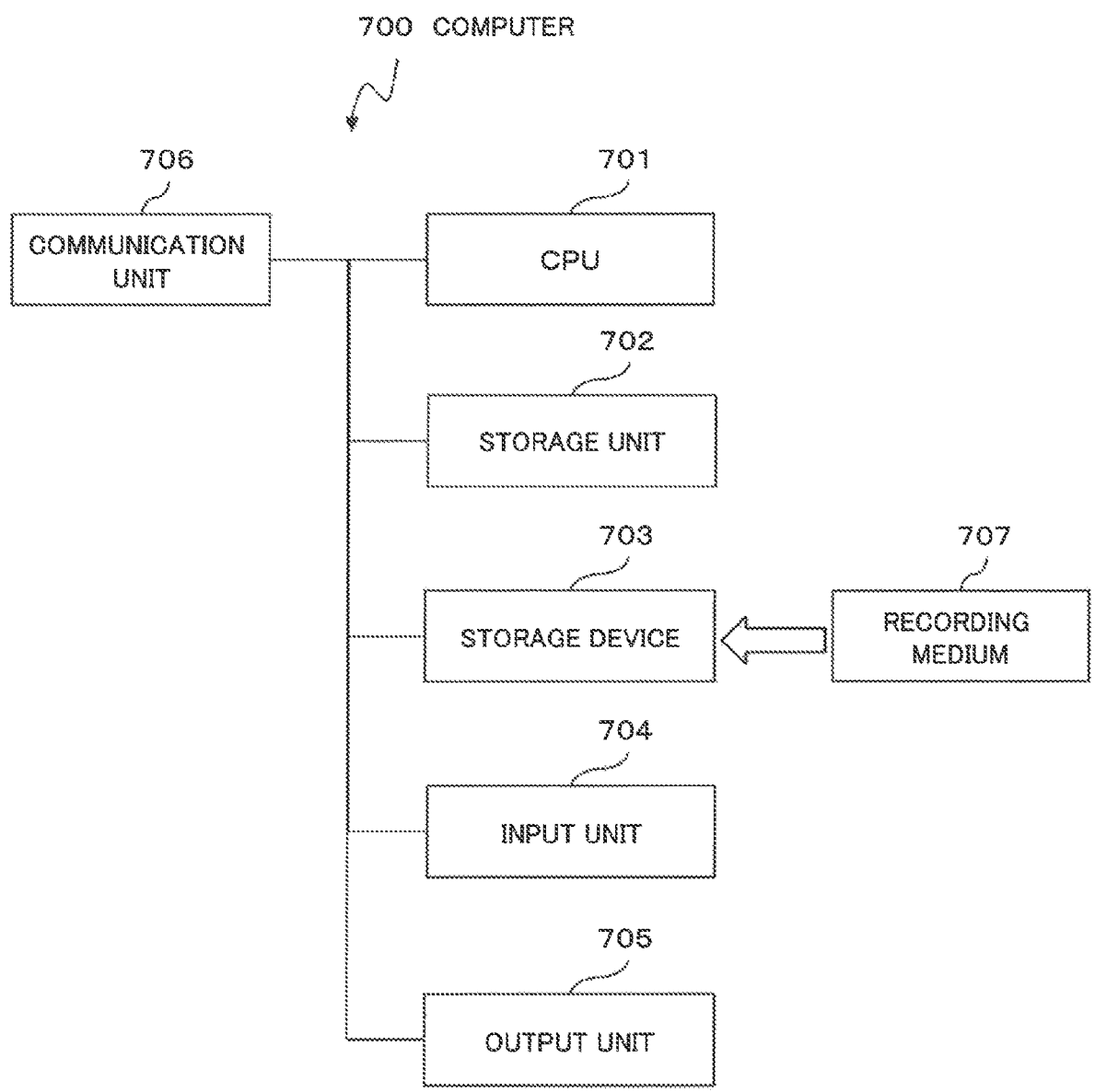
FIG. 2 is a block diagram illustrating a hardware configuration of a computer which implements the information processing system according to the first example embodiment.

FIG. 2 is a diagram illustrating a hardware configuration of a computer 700 which implements the information processing system 100 in the example embodiment.

As illustrated in FIG. 2, the computer 700 includes a CPU (Central Processing Unit) 701, a storage unit 702, a storage device 703, an input unit 704, an output unit 705, and a communication unit 706. Further, the computer 700 includes a recording medium (or a storage medium) 707 to be supplied from the outside. For instance, the recording medium 707 is a non-volatile recording medium (a non-transitory recording medium) which non-transitorily stores information. Further, the recording medium 707 may be a transitory recording medium which holds information as a signal.

The CPU 701 runs an operating system (not illustrated), and controls the overall operation of the computer 700. For instance, the CPU 701 reads a program or data from the recording medium 707 installed in the storage device 703, and writes the read program or data into the storage unit 702. In this example, the program is a program which causes the computer 700 to execute an operation of the flowchart illustrated in FIG. 3, which will be described later, for example.

Further, the CPU 701 executes a variety of processing of the node set acquiring unit 110 and the classifying unit 120 illustrated in FIG. 1 according to the read program or on the basis of the read data.

Note that the CPU 701 may download the program or the data into the storage unit 702 from an external computer (not illustrated) connected to a communication network (not illustrated).

The storage unit 702 stores the program or the data. The storage unit 702 may store relationship information 810 and a classification result 820. The storage unit 702 may be included as a part of the node set acquiring unit 110 and the classifying unit 120.

The storage device 703 is, for instance, an optical disc, a flexible disk, a magneto-optical disk, an external hard disk, a semiconductor memory, or the like, and includes the recording medium 707. The storage device 703 (the recording medium 707) stores the program in a computer readable manner. Further, the storage device 703 may store the data. The storage device 703 may include. [The storage device 703 may store the relationship information 810 and the classification result 820. The storage device 703 may be included as a part of the node set acquiring unit 110 and the classifying unit 120.]

The input unit 704 receives input by an operator's operation or input information from the outside. A device for use in an input operation is, for instance, a mouse, a keyboard, internal key buttons, a touch panel, and the like. The input unit 704 may be included as a part of the node set acquiring unit 110 and the classifying unit 120.

The output unit 705 is implemented by a display, for instance. The output unit 705 is used for an input request to an operator by a GUI (Graphical User Interface), output presentation to an operator, or the like, for instance. The output unit 705 may be included as a part of the node set acquiring unit 110 and the classifying unit 120.

The communication unit 706 implements an interface with respect to the outside. The communication unit 706 may be included as a part of the node set acquiring unit 110 and the classifying unit 120.

As described above, the constituent elements as functional units of the information processing system 100 illustrated in FIG. 1 are implemented by the computer 700 having the hardware configuration illustrated in FIG. 2. Note that means for implementing the units provided in the computer 700 is not limited to the above. Specifically, the computer 700 may be implemented by a physically integrated device, or may be implemented by two or more physically separated devices connected to each other using wired or wireless connection.

Note that when the recording medium 707 in which codes of the program are recorded is supplied to the computer 700, the CPU 701 may read the program codes stored in the recording medium 707 for execution. Alternatively, the CPU 701 may store the program codes stored in the recording medium 707 into one or both of the storage unit 702 and the storage device 703. Specifically, the example embodiment includes an example embodiment of the recording medium 707 which stores the program (a software component) to be executed by the computer 700 (the CPU 701) transitorily or non-transitorily. Note that a storage medium which stores information non-transitorily is also referred to as a non-volatile storage medium.

The foregoing is description about the constituent elements as hardware units of the computer 700 which implements the information processing system 100 in the example embodiment.

Referring back to FIG. 1, the constituent elements as functional units of the information processing system 100 are described.

Node Set Acquiring Unit 110

The node set acquiring unit 110 acquires, for each of first nodes to be classified (also referred to as elements), a set of second nodes reachable to the first node via links of an arbitrary number (also referred to as relations) on the basis of the relationship information 810. The relationship information 810 is information regarding one or more links between a plurality of nodes that constitute a system.

A node is, for instance, a process, a thread, a file, an environment variable, a registry, or the like. A node may be an execution file, a library, or the like as an application. A node may be a socket, a pipe, or the like as intra-process communication means. Further, a node may be a user or a machine. A machine is, for instance, a real machine or a virtual machine such as a computer, a server, or any other information processing device, a storage device, or a communication device.

The node set acquiring unit 110 may sort elements of the set on the basis of the relationship information 810, and may set the sorted elements as a set in the form of a list. For instance, the node set acquiring unit 110 sorts second nodes of the set on the basis of a distance from a first node to a second node (such as a length of a path, a weighted distance weighted with an amount of information transmission, a lapse of time, or the like). Further, the node set acquiring unit 110 may sort second nodes of the set on the basis of an attribute of a second node, an attribute of a node on a path, an attribute of a link on a path, or the like.

Classifying Unit 120

The classifying unit 120 classifies each of the first nodes to be classified into one of a plurality of roles (also referred to as role classes) on the basis of a set of the second nodes associated with each of the first nodes to be classified, and outputs the classification result 820, which is a result of classification. For instance, the classifying unit 120 sets each of the second node sets, which is associated with each of the first nodes to be classified, as a feature vector, and classifies the first nodes to be classified on the basis of these feature vectors. Note that when the node set acquiring unit 110 sets the second node set as a set in the form of a list as described above, the classifying unit 120 aligns the order of elements of the feature vectors with the order of the elements in the set in the form of a list.

Note that the classifying unit 120 may perform the aforementioned classification with use of a well-known classification algorithm (for example, k-mean clustering).

Further, the classifying unit 120 may use, in addition to the second node set, the number of elements in the set, an attribute of the first node or of each of the second nodes, or a statistical amount of the attribute, as an element of a feature vector. The classifying unit 120 may further include a distance between the first node and each of the second nodes, the number of paths, or the like as an element of a feature vector. In this case, the relationship information 810 may include an arbitrary attribute of each node.

The foregoing is description about the constituent elements as functional units of the information processing system 100.

Next, an operation of the example embodiment is described in detail referring to the drawings.

Figure 3:
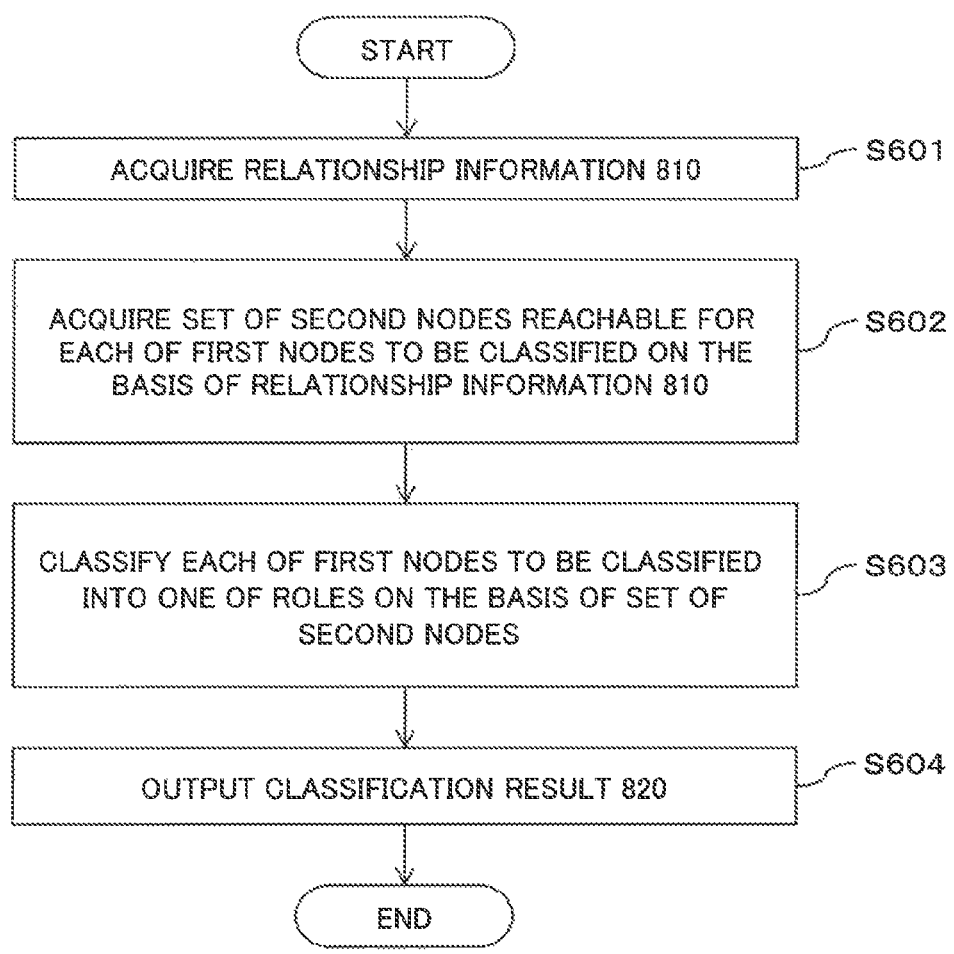
FIG. 3 is a flowchart illustrating an operation of the information processing system in the first example embodiment.

FIG. 3 is a flowchart illustrating an operation of the example embodiment. Note that the processing by the flowchart may be executed on the basis of program control by the aforementioned CPU 701. Further, the names of processing steps are described by a symbol as exemplified by S601.

In response to receiving an instruction from an operator via the input unit 704 illustrated in FIG. 2, for instance, the information processing system 100 starts an operation of the flowchart illustrated in FIG. 3. The information processing system 100 may start an operation of the flowchart illustrated in FIG. 3 in response to receiving a request from the outside via the communication unit 706 illustrated in FIG. 2.

The node set acquiring unit 110 acquires the relationship information 810 (Step S601). For instance, the relationship information 810 may be stored in advance in the storage unit 702 or the storage device 703 illustrated in FIG. 2. Alternatively, the node set acquiring unit 110 may acquire the relationship information 810, which is input by an operator via the input unit 704 illustrated in FIG. 2. Still alternatively, the node set acquiring unit 110 may receive the relationship information 810 from an unillustrated device via the communication unit 706 illustrated in FIG. 2. Alternatively, the node set acquiring unit 110 may acquire the relationship information 810 recorded in the recording medium 707 via the storage device 703 illustrated in FIG. 2.

Next, the node set acquiring unit 110 acquires a set of second nodes reachable to a certain first node via links of an arbitrary number on the basis of the relationship information 810, for each of the first nodes to be classified (Step S602). For instance, designation of the first node to be classified may be stored in advance in the storage unit 702 or the storage device 703 illustrated in FIG. 2. Further, the node set acquiring unit 110 may acquire designation of the first node to be classified, which is input by an operator via the input unit 704 illustrated in FIG. 2. Further, the node set acquiring unit 110 may receive designation of the first node to be classified from an unillustrated device via the communication unit 706 illustrated in FIG. 2. Further, the node set acquiring unit 110 may acquire designation of the first node to be classified, which is recorded in the recording medium 707, via the storage device 703 illustrated in FIG. 2.

Next, the classifying unit 120 classifies the first nodes to be classified into a plurality of roles on the basis of a set of the second nodes associated with each of the first nodes to be classified (Step S603).

Next, the classifying unit 120 outputs the classification result 820, which is a result of classification (Step S604).

Next, the aforementioned operation is described by a specific example.

Figure 4:
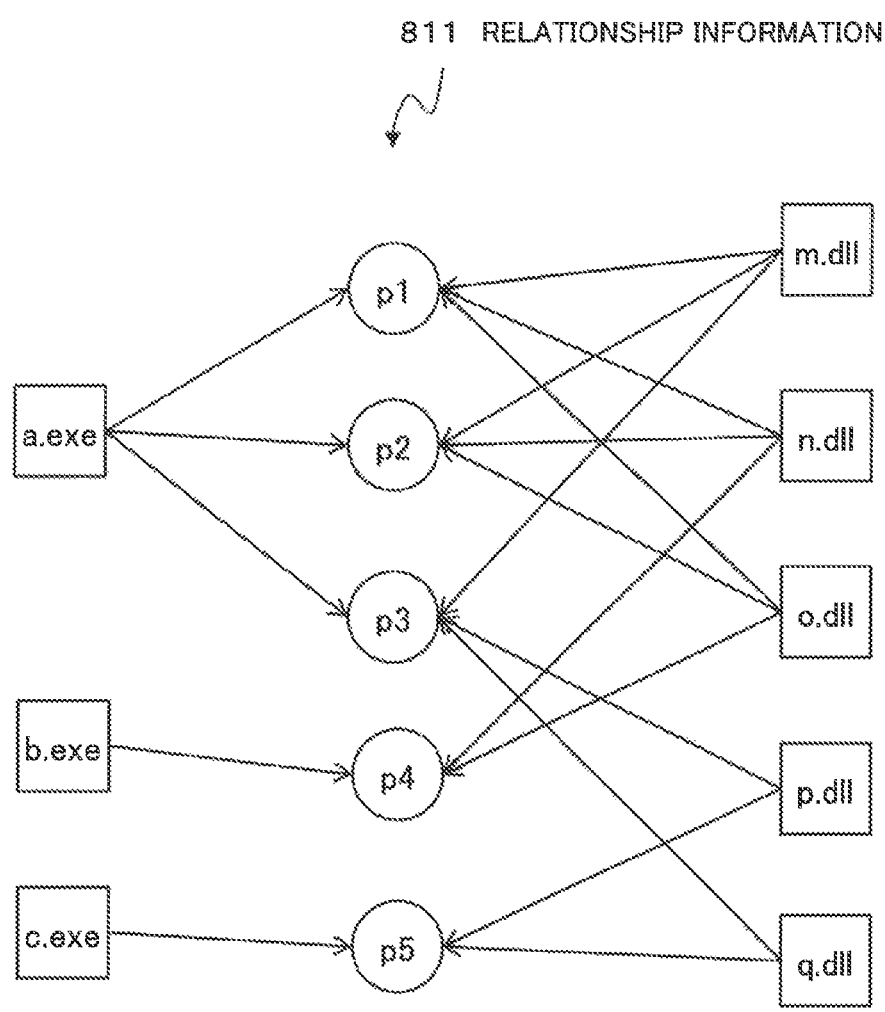
FIG. 4 is a diagram illustrating an example of relationship information in the first example embodiment.

FIG. 4 is a diagram illustrating relationship information 811, which is a specific example of the relationship information 810. In FIG. 4, a circle indicates a process, which is a type of node, and a rectangle indicates a file, which is a type of node. Character strings within a circle and a rectangle are an identifier of each node. Specifically, "a.exe", "b.exe", and "c.exe" are execution files (applications). Further, "m.dll", "n.dll", "o.dll", "p.dll", and "q.dll" are program components included in a program component library.

The node set acquiring unit 110 which has acquired the relationship information 811 further acquires a set of second nodes reachable for each process as follows by assuming that a process is a first node to be classified, for instance. The node set acquiring unit 110 acquires {a.exe, m.dll, n.dll, o.dll} as a set associated with a process "p1". The node set acquiring unit 110 acquires {a.exe, m.dll, n.dll, o.dll} as a set associated with a process "p2". The node set acquiring unit 110 acquires {a.exe, m.dll, p.dll, q.dll} as a set associated with a process "p3". The node set acquiring unit 110 acquires {b.exe, n.dll, o.dll} as a set associated with a process "p4". The node set acquiring unit 110 acquires {c.exe, p.dll, q.dll} as a set associated with a process "p5".

Figure 5:
FIG. 5 is a diagram illustrating an example of a classification result in the first example embodiment.

Next, the classifying unit 120 classifies the processes on the basis of a set associated with the aforementioned processes, and outputs a classification result 821 as illustrated in FIG. 5.

FIG. 5 is a diagram illustrating the classification result 821, which is a specific example of the classification result 820. As illustrated in FIG. 5, each record of the classification result 821 includes a role identifier and a node identifier. Referring to FIG. 5 the process "p1", the process "p2", and the process "p4" are classified into a role "role1". Further, the process "p3" and the process "p5" are classified into a role "role2".

An administrator is able to confirm the classification result 821, and to detect the following anomaly, for instance. The anomaly is that "the process "p1", the process "p2", and the process "p3" generated from the same execution file "a.exe" are classified into the role "role1" and the role "role2" which are different from each other".

Figure 6:
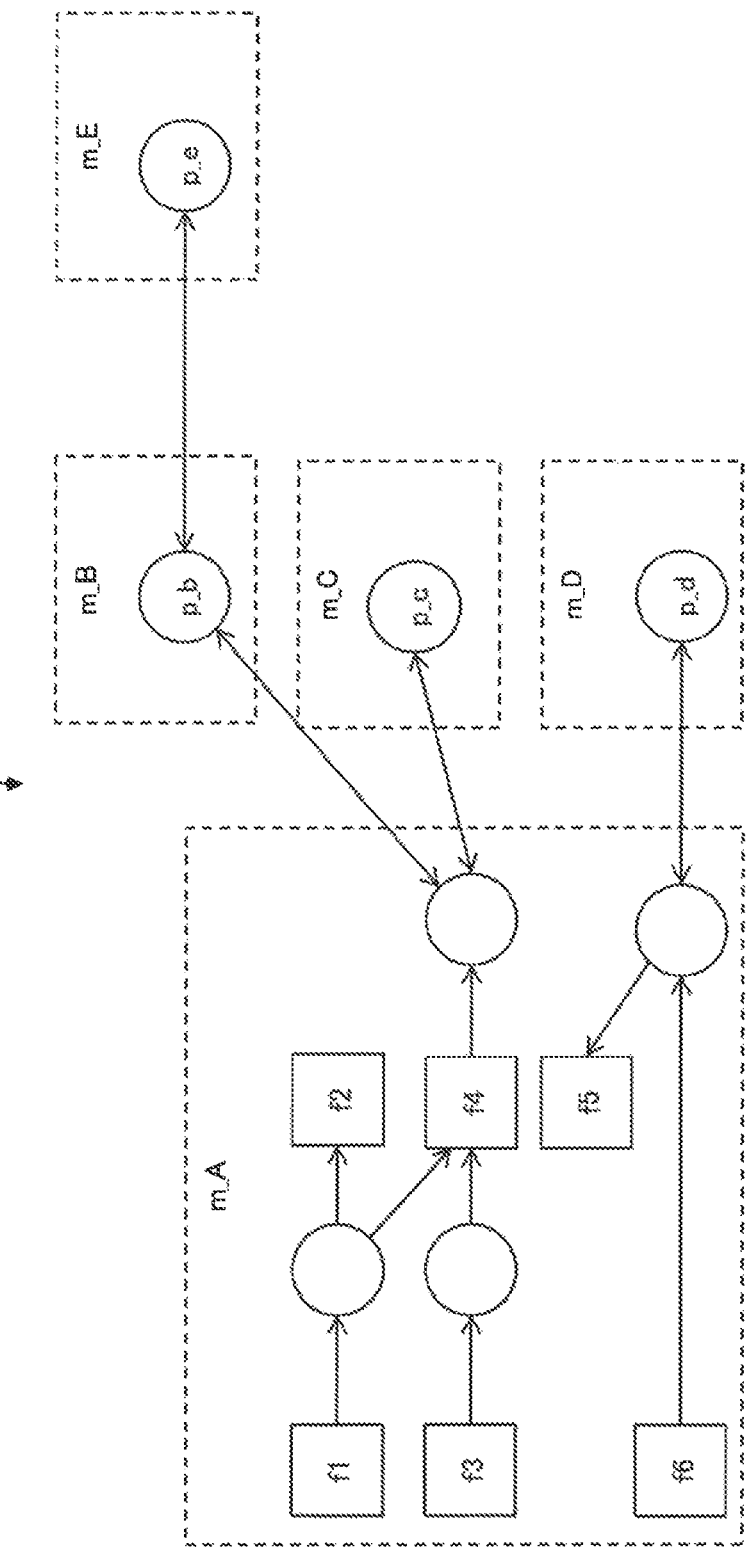
FIG. 6 is a diagram illustrating an example of relationship information in the first example embodiment.

FIG. 6 is a diagram illustrating relationship information 812, which is another specific example of the relationship information 810. In FIG. 6, a circle indicates a process, which is a type of node, and a rectangle indicates a file, which is another type of node. Character strings within the circle and the rectangle are an identifier of each node. Further, a dotted line rectangle indicates a machine, and character strings in an upper portion of the dotted line rectangle indicate an identifier of each machine. Further, these dotted line rectangles indicate that a node included in each of the dotted line rectangles has an identifier of a machine associated with each of the dotted line rectangles, as an attribute indicating "an identifier of a machine to which the node belongs". Alternatively, the belonging relationship between each node and the machine may be expressed such that each machine is indicated as a node, and the belonging relationship is indicated by a link.

The node set acquiring unit 110 which acquires the relationship information 812 acquires a set of second nodes reachable for each file as follows by assuming that a file is a first node to be classified, for instance. The node set acquiring unit 110 acquires {p_b, p_c, p_e} as a set associated with a file "f1". The node set acquiring unit 110 acquires { } (an empty set) as a set associated with a file "f2". The node set acquiring unit 110 acquires {p_b, p_c, p_e} as a set associated with a file "f3". The node set acquiring unit 110 acquires {p_b, p_c, p_e} as a set associated with a file "f4". The node set acquiring unit 110 acquires { } (an empty set) as a set associated with a file "f5". The node set acquiring unit 110 acquires {p_d} as a set associated with a file "f6".

Figure 7:
FIG. 7 is a diagram illustrating an example of a classification result in the first example embodiment.

Next, the classifying unit 120 classifies the files on the basis of a set associated with the aforementioned files, and outputs a classification result 822 as illustrated in FIG. 7.

FIG. 7 is a diagram illustrating the classification result 822, which is another specific example of the classification result 820. As illustrated in FIG. 7, each record of the classification result 822 includes a role identifier and a node identifier. Referring to FIG. 7, the file "f2" and the file "f5" are classified into the role "role1". The file "f1", the file "f3", and the file "f4" are classified into the role "role2". The file "f6" is classified into the role "role3". Specifically, the files are classified into the following roles, respectively. The role "role1" is "a role in which the content of the file is not transmitted to other machines". The role "role2" is "a role in which the content of the file is transmitted or may be transmitted to a plurality of machines". The role "role3" is "a role in which the content of the file is transmitted only to m_D".

The foregoing is description about an operation of the example embodiment.

The information processing system 100 classifies these elements by the same operation as described above also when a node to be classified is a machine or a user.

For instance, it is assumed that the node set acquiring unit 110 acquires "machines indicated by mA, mB, mC, mD, and mE" as designation of the first node to be classified, which is input by an operator via the input unit 704 illustrated in FIG. 2.

The information processing system 100 regards each of the designated machines as a node. Further, the information processing system 100 classifies roles of the machines on the basis of a relationship between a machine which frequently accesses (reaches) a specific machine, and a machine which is frequently accessed from a plurality of machines, a relationship such that mutual communication (reaching) is frequent but a machine does not access a specific machine, or the like.

For instance, roles of a machine may include a role of an office-based client when the machine is a client, a role of a terminal for experiment, a role of a business-use WEB server when the machine is a server, a role of a file server which holds technical information, and the like. In this case, the information processing system 100 classifies these roles based on the premise that an office-based client frequently accesses a business-use WEB server, an experimental terminal communicates with another experimental terminal, but does not access a business-use WEB server or the like.

Note that the information processing system 100 may classify roles of the machines on the basis of a role of a process or a file included in each machine, instead of regarding a machine itself as a node.

An advantageous effect of the aforementioned example embodiment is that it is possible to classify elements that constitute an information processing device or the like in an advantageous manner.

The reason is because the following configuration is included. Specifically, firstly, the node set acquiring unit 110 acquires, for each of first nodes, a set of second nodes reachable to a first node on the basis of the relationship information 810. Secondly, the classifying unit 120 classifies each of the first nodes into one of a plurality of roles on the basis of the set of second nodes.

Another reason is that the node set acquiring unit 110 sorts the set of second nodes on the basis of the relationship information 810, and the classifying unit 120 aligns the order of elements of the feature vectors with the order of elements in the sorted set.

Yet another reason is that the classifying unit 120 can use any information obtained from the relationship information 810 as an element of a feature vector, and classifies each of the first nodes into one of the plurality of roles on the basis of the feature vector.

Modification of First Example Embodiment

Figure 8:
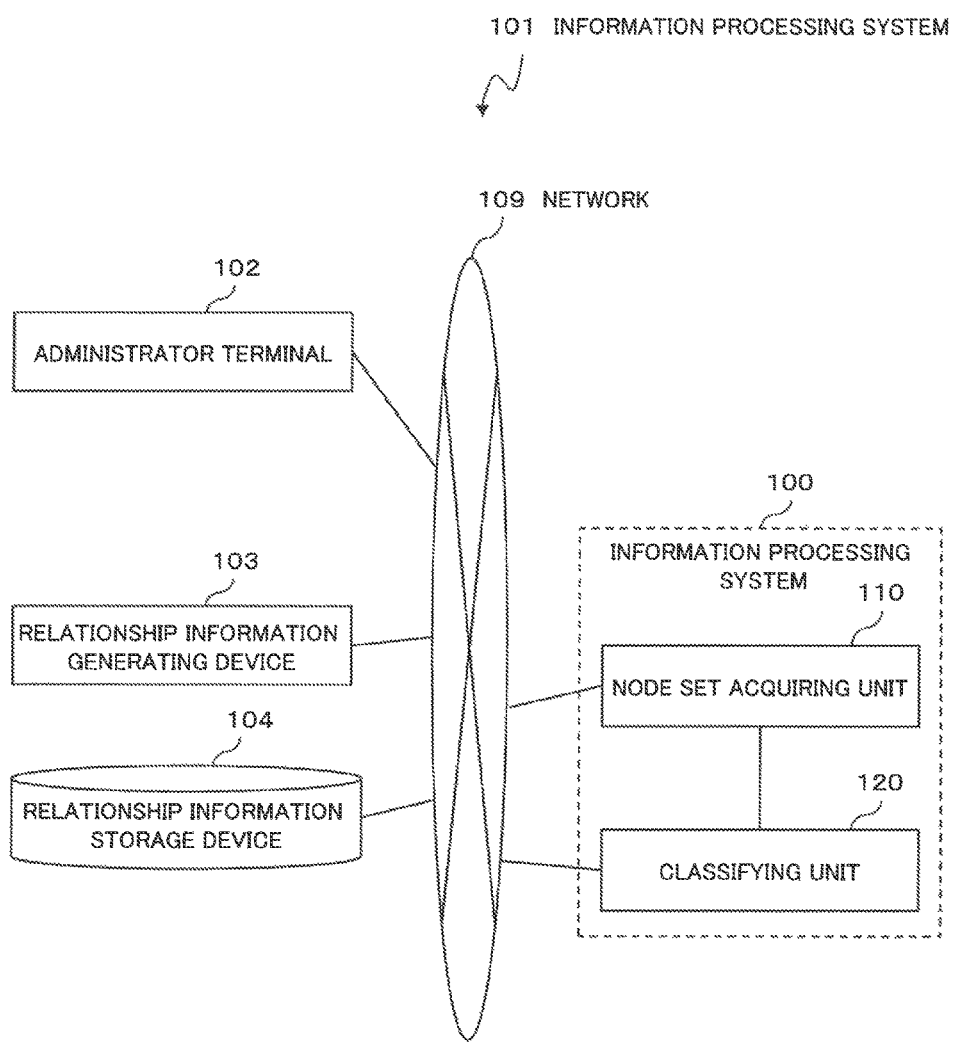
FIG. 8 is a block diagram illustrating a configuration of an information processing system as a modification of the first example embodiment of the present invention.

FIG. 8 is a diagram illustrating an information processing system 101 as a modification of the first example embodiment. As illustrated in FIG. 8, the information processing system 101 includes the information processing system 100 illustrated in FIG. 1, an administrator terminal 102, a relationship information generating device 103, and a relationship information storage device 104. The information processing system 100, the administrator terminal 102, the relationship information generating device 103, and the relationship information storage device 104 are connected via a network 109. Note that regardless of the example of FIG. 8, an arbitrary combination of the information processing system 100, the administrator terminal 102, the relationship information generating device 103, and the relationship information storage device 104 may be a single unit of the computer 700 as illustrated in FIG. 2. Further, any pair of the information processing system 100, the administrator terminal 102, the relationship information generating device 103, and the relationship information storage device 104 may be directly connected with each other without via a network. Specifically, the information processing system 100, the administrator terminal 102, the relationship information generating device 103, and the relationship information storage device 104 may be arbitrarily connected via the network 109.

Administrator Terminal 102

The administrator terminal 102 transmits an instruction to execute classifying processing to the information processing system 100 on the basis of an administrator's operation. Further, the administrator terminal 102 receives the classification result 820 from the information processing system 100, and displays the content of the classification result 820.

Relationship Information Generating Device 103

The relationship information generating device 103 generates the relationship information 810, and transmits the relationship information 810 to the relationship information storage device 104. Further, the relationship information generating device 103 may receive the classification result 820 from the information processing system 100, and may update the relationship information 810 on the basis of the received classification result 820 (for example, may reflect information of the classification result 820 to the relationship information 810).

Relationship Information Storage Device 104

The relationship information storage device 104 stores the relationship information 810 received from the relationship information generating device 103.

Information Processing System 100

The information processing system 100 receives an instruction to execute classifying processing from the administrator terminal 102, and acquires the relationship information 810 from the relationship information storage device 104 on the basis of the instruction to execute. Next, the information processing system 100 executes classifying processing on the basis of the relationship information 810, generates the classification result 820, and transmits the classification result 820 to the administrator terminal 102. Further, the information processing system 100 may transmit the classification result 820 to the relationship information generating device 103.

An advantageous effect of the modification of the aforementioned example embodiment is that it is possible to flexibly configure the information processing system 101 (for example, reduce the restriction on an installation place or the like).

The reason for this is that the information processing system 100, the administrator terminal 102, the relationship information generating device 103, and the relationship information storage device 104 are arbitrarily connected via the network 109.

Second Example Embodiment

Next, the second example embodiment of the present invention is described in detail referring to the drawings. In the following, description regarding the content that overlaps the aforementioned description is omitted as far as description of the example embodiment is not made unclear.

Figure 9:
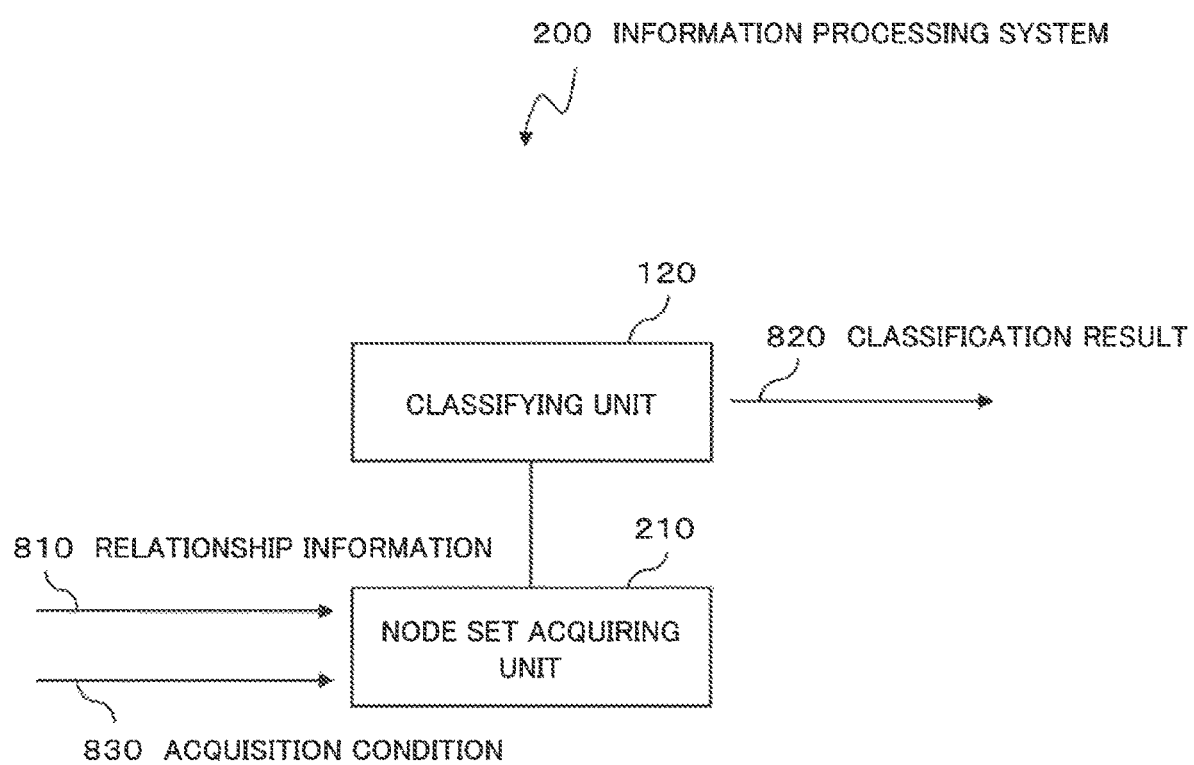
FIG. 9 is a block diagram illustrating a configuration of an information processing system according to a second example embodiment of the present invention.

FIG. 9 is a block diagram illustrating a configuration of an information processing system 200 according to the second example embodiment of the present invention.

As illustrated in FIG. 9, the information processing system 200 in the example embodiment is different from the information processing system 100 in the first example embodiment in a point that a node set acquiring unit 210 is included in place of the node set acquiring unit 110.

Node Set Acquiring Unit 210

The node set acquiring unit 210 acquires a set of second nodes reachable as described above further on the basis of an acquisition condition 830.

The acquisition condition 830 is, for instance, designation on a direction of a link via which a second node reaches a first node. A specific example of the acquisition condition 830 is that "all the links have at least a direction directing from a second node to a first node".

The acquisition condition 830 may alternatively be that "it is reachable in terms of time when there is a time limit on existence of either a second node or each of a link and a node via which the second node reaches a first node".

The acquisition condition 830 may still alternatively be a condition relating to a distance between a first node and a second node, an attribute of a link and a node via which a first node reaches a second node, an attribute of a second node, or the like. In this example, the distance may be a length of a path, a weighted distance weighed with an amount of information transmission, or a lapse of time.

The acquisition condition 830 is not limited to the aforementioned example, and may be a condition with respect to arbitrary information to be obtained from the acquisition condition 830, or may be arbitrary combination of these conditions.

The information processing system 200 may be implemented by the computer 700 illustrated in FIG. 2, as well as the information processing system 100 illustrated in FIG. 1.

In this case, a CPU 701 executes a variety of processing according to a program read by the CPU 701, or on the basis of data read by the CPU 701, and functions as the node set acquiring unit 210 illustrated in FIG. 9. In this example, the program is, for instance, a program which causes the computer 700 to execute an operation of the flowchart illustrated in FIG. 10, which will be described later.

A storage unit 702 may further store the acquisition condition 830. The storage unit 702 may be included as a part of the node set acquiring unit 210.

A storage device 703 may further store the acquisition condition 830. The storage device 703 may be included as a part of the node set acquiring unit 210.

An input unit 704 may be included as a part of the node set acquiring unit 210.

An output unit 705 may be included as a part of the node set acquiring unit 210.

A communication unit 706 may be included as a part of the node set acquiring unit 210.

Next, an operation of the example embodiment is described in detail referring to the drawings.

Figure 10:
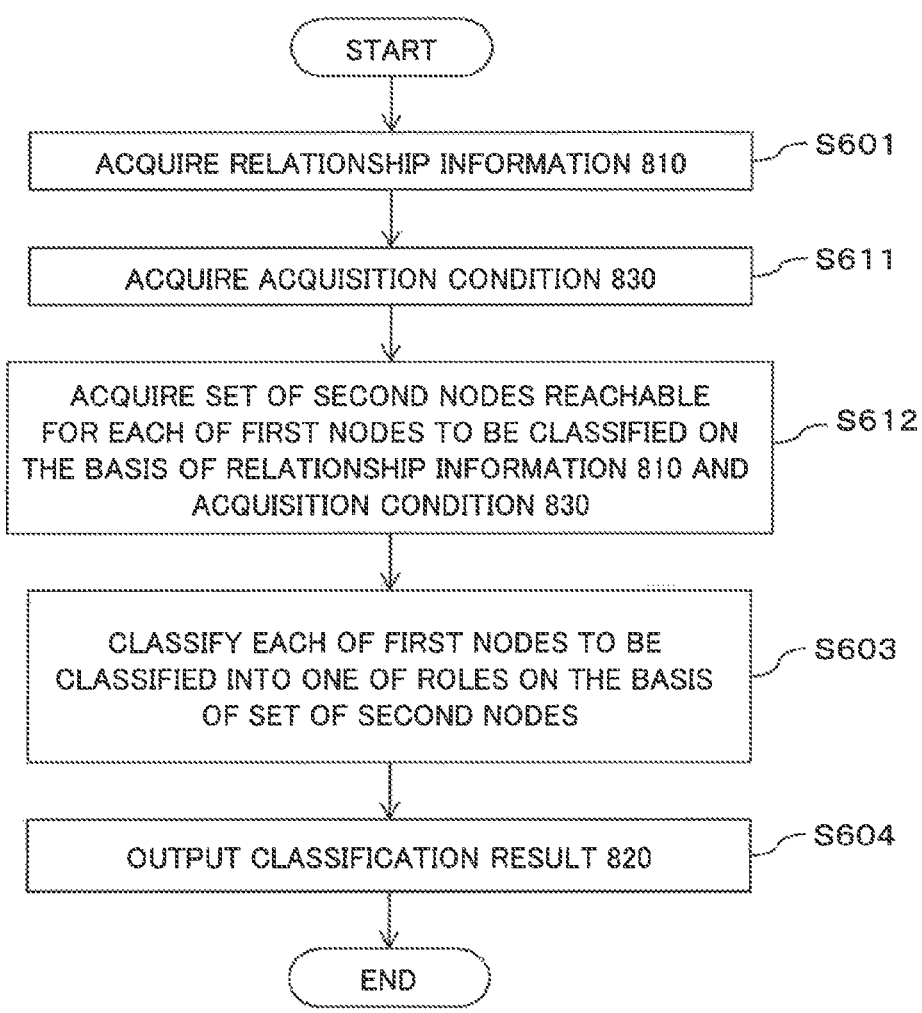
FIG. 10 is a flowchart illustrating an operation of the information processing system in the second example embodiment.

FIG. 10 is a flowchart illustrating an operation of the example embodiment. The operation of the example embodiment illustrated in the flowchart of FIG. 10 is different from the operation of the flowchart illustrated in FIG. 3 in a point that Step S611 is added and in a point that Step S602 is replaced by Step S612.

Subsequently to Step S601, the node set acquiring unit 210 acquires the acquisition condition 830 (Step S611). For instance, the acquisition condition 830 may be stored in advance in the storage unit 702 or the storage device 703 illustrated in FIG. 2. Further, the node set acquiring unit 210 may acquire the acquisition condition 830, which is input by an operator via the input unit 704 illustrated in FIG. 2. Further, the node set acquiring unit 210 may receive the acquisition condition 830 from an unillustrated device via the communication unit 706 illustrated in FIG. 2. Further, the node set acquiring unit 210 may acquire the acquisition condition 830 recorded in a recording medium 707 via the storage device 703 illustrated in FIG. 2.

Next, the node set acquiring unit 210 acquires a set of second nodes reachable to a certain first node via links of an arbitrary number on the basis of relationship information 810 and the acquisition condition 830, for each of the first nodes to be classified (Step S612).

The foregoing is description about an operation of the example embodiment.

Note that as a modification of the example embodiment, the information processing system 101 illustrated in FIG. 8 may be a system including the information processing system 200 in place of the information processing system 100.

An advantageous effect of the aforementioned example embodiment is that it is possible to more appropriately classify elements that constitute an information processing device or the like, in addition to the advantageous effects of the first example embodiment.

The reason for this is that the node set acquiring unit 210 acquires a set of second nodes reachable as described above further on the basis of the acquisition condition 830. Specifically, it is possible to narrow elements of a set of second nodes reachable as described above in line with an object by the acquisition condition 830.

Third Example Embodiment

Next, the third example embodiment of the present invention is described in detail referring to the drawings. In the following, description regarding the content that overlaps the aforementioned description is omitted as far as description of the example embodiment is not made unclear.

Figure 11:
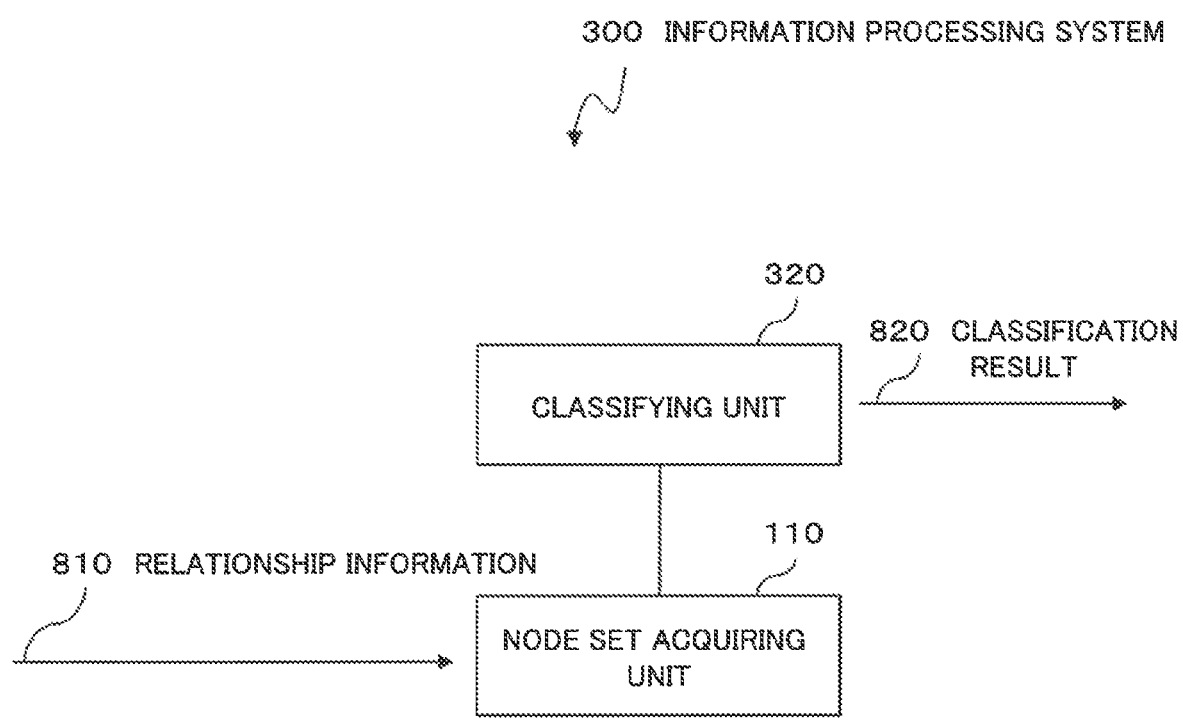
FIG. 11 is a block diagram illustrating a configuration of an information processing system according to a third example embodiment of the present invention.

FIG. 11 is a block diagram illustrating a configuration of an information processing system 300 according to the third example embodiment of the present invention.

As illustrated in FIG. 11, the information processing system 300 in the example embodiment is different from the information processing system 100 in the first example embodiment in a point that a classifying unit 320 is included in place of the classifying unit 120.

Classifying Unit 320

When a first node is an application, the classifying unit 320 further classifies each of the applications into one of a plurality of roles on the basis of a relative relationship between existence periods of a plurality of second nodes, wherein the plurality of second nodes are processes generated from the application.

The information processing system 300 may be implemented by the computer 700 illustrated in FIG. 2 as with the information processing system 100 illustrated in FIG. 1.

In this case, a CPU 701 executes a variety of processing according to a program read by the CPU 701 or on the basis of data read by the CPU 701, and further as the classifying unit 320 illustrated in FIG. 11. In this example, the program is, for instance, a program which causes the computer 700 to execute an operation of the flowchart illustrated in FIG. 13, which will be described later.

A storage unit 702 may be included as a part of the classifying unit 320.

A storage device 703 may be included as a part of the classifying unit 320.

An input unit 704 may be included as a part of the classifying unit 320.

An output unit 705 may be included as a part of the classifying unit 320.

A communication unit 706 may be included as a part of the classifying unit 320.

Next, an operation of the example embodiment is described in detail referring to the drawings.

Figure 12:
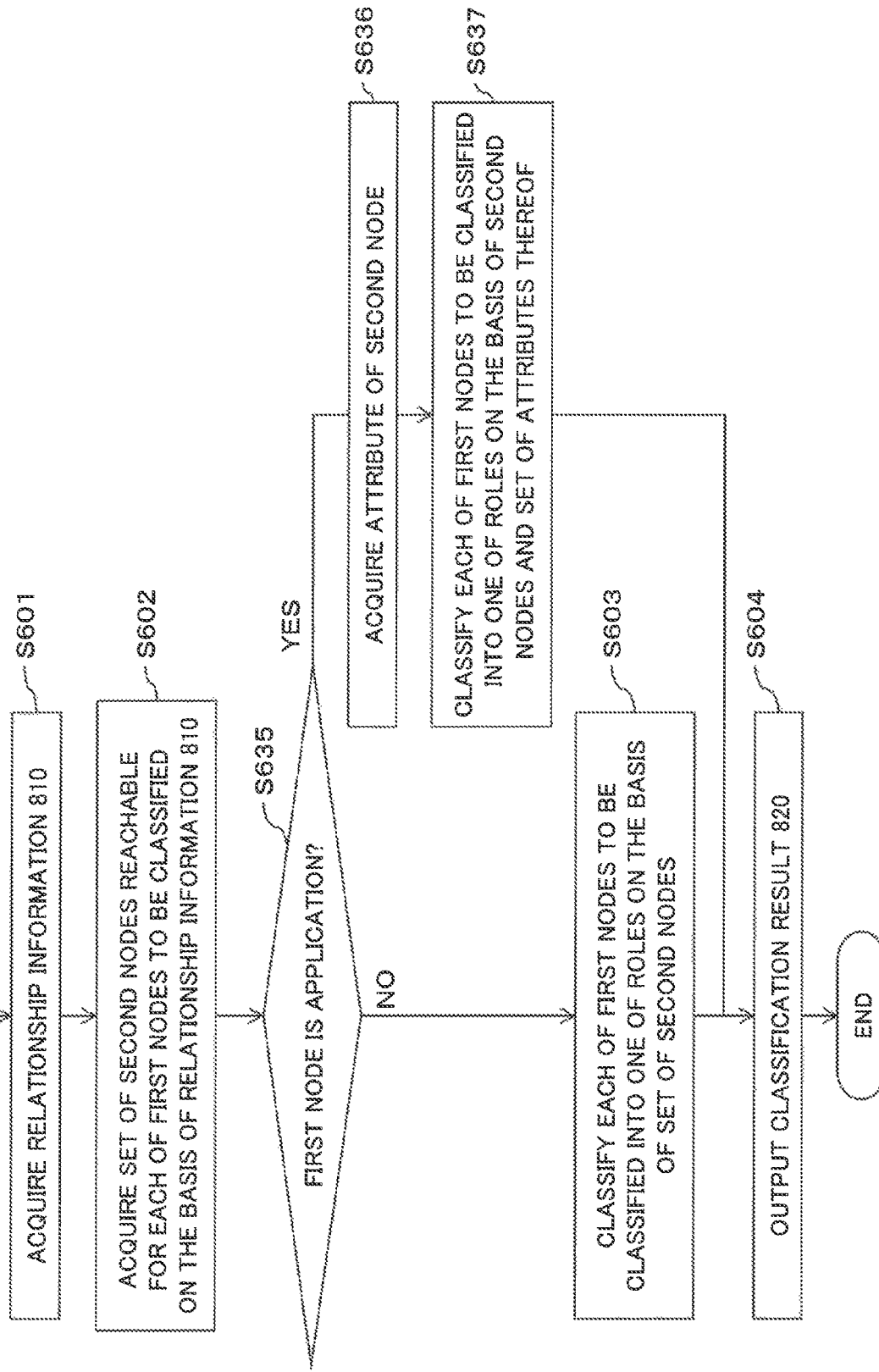
FIG. 12 is a flowchart illustrating an operation of the information processing system in the third example embodiment.

FIG. 12 is a flowchart illustrating an operation of the example embodiment. Note that processing by the flowchart may be executed on the basis of program control by the aforementioned CPU 701. Further, the names of processing steps are described by a symbol as exemplified by S601.

The information processing system 300 starts an operation of the flowchart illustrated in FIG. 12 in response to receiving an instruction from an operator via the input unit 704 illustrated in FIG. 2, for instance. The information processing system 300 may start an operation of the flowchart illustrated in FIG. 12 in response to receiving a request from the outside via the communication unit 706 illustrated in FIG. 2.

Step S601 and Step S602 are the same as Step S601 and Step S602 illustrated in FIG. 3.

Next, the classifying unit 320 determines whether or not a first node to be classified is an application (Step S635). When the first node to be classified is an application (YES in Step S635), the processing proceeds to Step S636. When the first node to be classified is not an application (NO in Step S635), the processing proceeds to Step S603.

The classifying unit 320 acquires an attribute (information on an existence period) of a second node, which is included in the set acquired in Step S602 (Step S636).

Next, the classifying unit 320 classifies each of the first nodes to be classified into one of a plurality of roles on the basis of the set acquired in Step S602 and the attribute acquired in Step S636 (Step S637). Thereafter, the processing proceeds to Step S604.

Step S603 and Step S604 are the same as Step S603 and Step S604 illustrated in FIG. 3.

Next, the aforementioned operation is described by illustrating a specific example.

Figure 13:
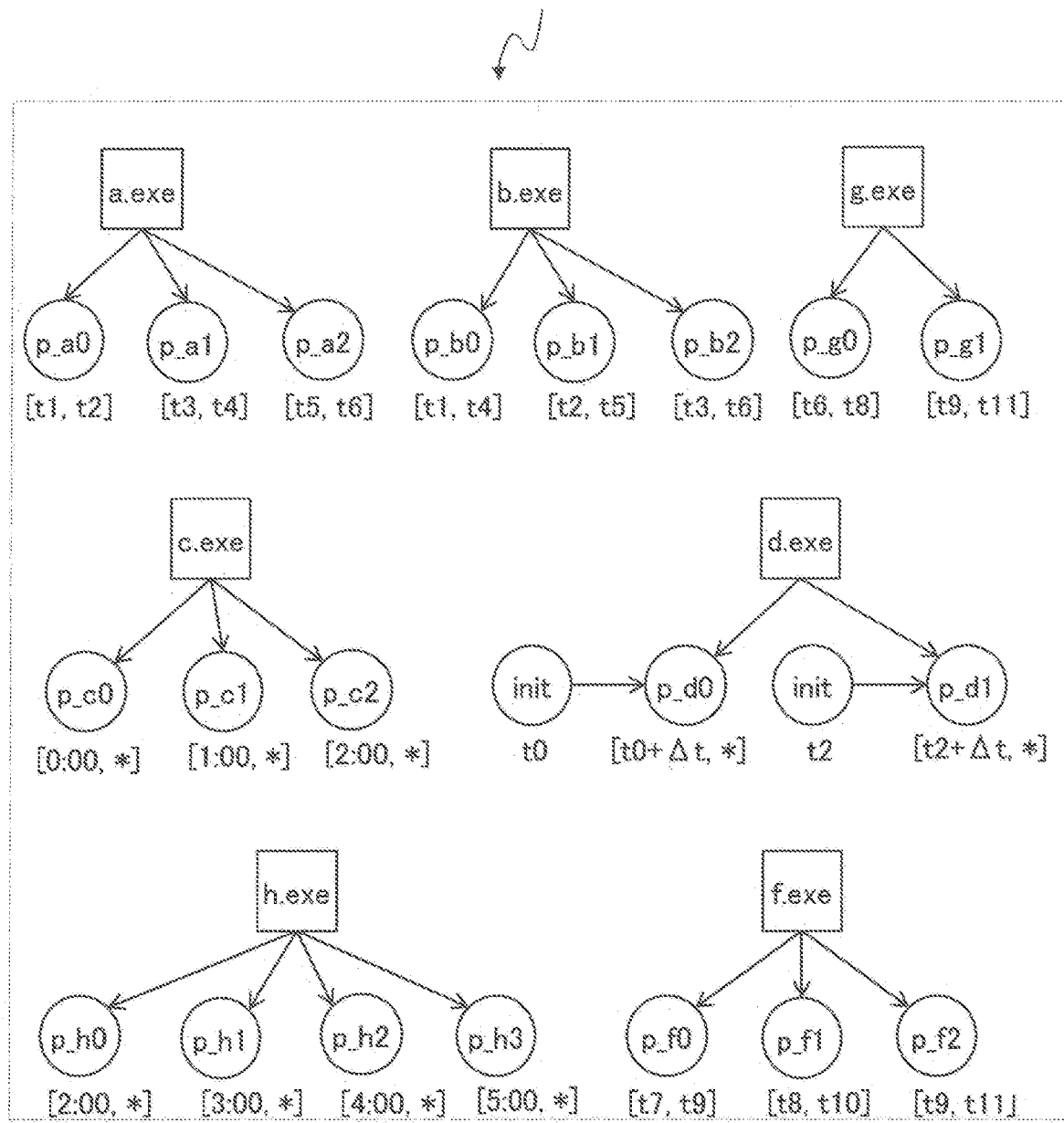
FIG. 13 is a diagram illustrating an example of relationship information in the third example embodiment.

FIG. 13 is a diagram illustrating relationship information 813, which is a specific example of the relationship information 810. In FIG. 13, a circle indicates a process, which is a type of node, and a rectangle indicates a file, which is a type of node (in this example, an execution file, specifically, an application). Character strings within a circle and a rectangle are an identifier of each node. Further, character strings in a lower portion of each of the nodes of the processes indicate an existence period of each process. For instance, [t1, t2] in a lower portion of a process "p_a0" indicates that the existence period of the process "p_a0" is from the point of time t1 to the point of time t2. Note that regarding tn, the larger the value of n is, the more advanced the time is. Further, [0:00, *] in a lower portion of a process "p_c0" indicates that the existence period of the process "p_c0" is from the point of time 0:00 to the point of time * (* indicates that the time is not specified). Further, [t0+Δt, *] in a lower portion of a process "p_d0" indicates that the existence period of the process "p_d0" is from the point of time t0+Δt to the point of time *. In this example, t0 indicates a point of time when an init process is started, and Δt indicates a predetermined time. Specifically, t0+Δt is a point of time after lapse of a predetermined time from a point of time when an init process is started.

The node set acquiring unit 110 which acquires the relationship information 813 acquires a set of second nodes reachable for each application as follows by assuming that an application (an execution file) is a first node to be classified, for instance. The node set acquiring unit 110 acquires {p_a0, p_a1, p_a2} as a set associated with an application "a.exe". The node set acquiring unit 110 acquires {p_b0, p_b1, p_b2} as a set associated with an application "b.exe". The node set acquiring unit 110 acquires {p_c0, p_c1, p_c2} as a set associated with an application "c.exe". The node set acquiring unit 110 acquires {p_d0, p_d1} as a set associated with an application "d.exe". The node set acquiring unit 110 acquires {p_f0, p_f1, p_f2} as a set associated with an application "f.exe". The node set acquiring unit 110 acquires {p_g0, p_g1} as a set associated with an application "g.exe".

Figure 14:
FIG. 14 is a diagram illustrating an example of a classification result in the third example embodiment.

Next, the classifying unit 320 classifies the processes on the basis of a set associated with each process and an attribute of an element in the set, and outputs a classification result 823 (to be described later) as illustrated in FIG. 14. Specifically, firstly, the classifying unit 320 adds, to a vector of a set associated with each application, an existence period of an element in the set as an element. Secondly, the classifying unit 320 classifies the processes on the basis of a vector having the existence period added thereto, and outputs the classification result 823. A vector having an existence period added thereto, and which is associated with an application "a.exe" is {p_a0, [t1, t2], p_a1, [t3, t4], p_a2, [t5, t6]}. A vector having an existence period added thereto, and which is associated with an application "b.exe" is {p_b0, [t1, t4], p_b1, [t2, t5], p_b2, [t3, t6]}. A vector having an existence period added thereto, and which is associated with an application "c.exe" is {p_c0, [0:00, *], p_c1, [1:00, *], p_c2, [2:00, *]}. A vector having an existence period added thereto, and which is associated with an application "d.exe" is {p_d0, [t0+Δt, *], p_d1, [t2+Δt, *]}. A vector having an existence period added thereto, and which is associated with an application "f.exe" is {p_f0, [t7, t9], p_f1, [t8, t10], p_f2, [t9, t11]}. A vector having an existence period added thereto, and which is associated with an application "g.exe" is {p_g0, [t6, t8], p_g1, [t9, t11]}.

FIG. 14 is a diagram illustrating the classification result 823, which is another specific example of the classification result 820. As illustrated in FIG. 14, each record of the classification result 823 includes a role identifier and a node identifier. Referring to FIG. 14, the application "a.exe" and the application "g.exe" are classified into a role "role1". The application "b.exe" and the application "f.exe" are classified into a role "role2". The application "c.exe" and an application "h.exe" are classified into a role "role3". The application "d.exe" is classified into a role "role4". Specifically, each application is classified into one of the following roles. The role "role1" is "a role being an only one application to be executed exclusively". The role "role2" is "a role being a plurality of applications to be executed concurrently". The role "role3" is "a role being an application to be executed at a fixed time interval". The role "role4" is "a role being an application to be executed each time when an init process is started".

The foregoing is description about an operation of the example embodiment.

Note that as a modification of the example embodiment, the information processing system 101 illustrated in FIG. 8 may be a system including the information processing system 300 in place of the information processing system 100.

An advantageous effect of the aforementioned example embodiment is that it is possible to more appropriately classify applications, in addition to the advantageous effects of the first example embodiment.

The reason for this is that the classifying unit 320 classifies each of the applications into one of a plurality of roles on the basis of a relative relationship between existence periods of processes generated from the applications.

Presenting (visualizing) the classification result 820 to be obtained in the example embodiments described above to an administrator makes it possible to support system administration of the administrator.

Further, it is possible to automatically detect an anomaly of a system to be monitored on the basis of the following classification result 820, for instance. The classification result 820 is different from a content designated in advance by a system administrator. The classification result 820 indicates that a certain node is classified into a specific role. The classification result 820 indicates that the role of a certain node is changed from a certain role to another role at a certain point of time.

Further, sharing a steady-state model between elements having a same role on the basis of the classification result 820 makes it possible to improve precision of the steady-state model.

Constituent elements described in the example embodiments may not necessarily be elements that are individually independent of each other. For instance, a plurality of arbitrary constituent elements may be implemented as a module. Further, any one of the constituent elements may be implemented as a plurality of modules. Further, any one of the constituent elements may be another one of the constituent elements. Further, a part of any one of the constituent elements, and a part of another one of the constituent elements may overlap.

Constituent elements, and modules which implement the constituent elements in the aforementioned example embodiments may be implemented in terms of a hardware component as necessary and if possible. Further, constituent elements, and modules which implement the constituent elements may be implemented by a computer and a program. Further, constituent elements, and modules which implement the constituent elements may be implemented by co-existence of a hardware module, a computer, and a program.

For instance, the program is recorded in a computer readable non-transitory recording medium such as a magnetic disk or a semiconductor memory, and is provided to a computer. Further, the program is read from a non-transitory recording medium by a computer when the computer is started up. The read program causes the computer to function as the constituent elements in the aforementioned example embodiments by controlling an operation of the computer.

Further, in the aforementioned example embodiments, a plurality of operations are described in the order in the form of a flowchart. The order of description, however, is not limited to the order in which a plurality of operations are executed. In view of the above, when the example embodiments are implemented, it is possible to modify the order of the plurality of operations as far as there is no inconvenience in terms of content.

Further, the aforementioned example embodiments are not limited to a configuration that a plurality of operations are executed at timings different from each other. For instance, another operation may be generated during execution of a certain operation. Further, timings at which a certain operation and another operation are executed may overlap partially or entirely.

Further, in the aforementioned example embodiments, it is described that a certain operation is a trigger of another operation. The description, however, does not limit a relationship between a certain operation and another operation. In view of the above, when the example embodiments are implemented, it is possible to modify a relationship between the plurality of operations as far as there is no inconvenience in terms of content. Further, specific description of the operations of the constituent elements does not limit the operations of the constituent elements. In view of the above, it is possible to modify specific operations of the constituent elements as far as there is no inconvenience in terms of functions, performances, and other characteristics in implementing the example embodiments.

In the foregoing, the invention of the present application is described referring to the example embodiments. The invention of the present application, however, is not limited to the aforementioned example embodiments. The configuration and details of the present invention may be modified in various ways comprehensible to a person skilled in the art within the scope of the present invention.

This application claims the priority based on Japanese Patent Application No. 2014-220922 filed on Oct. 30, 2014, and all of the disclosure of which is hereby incorporated.

INDUSTRIAL APPLICABILITY

The present invention is applicable to a monitoring system which monitors a system to be monitored, a system which generates a steady-state model of a target system, or the like.

REFERENCE SIGNS LIST

100 Information processing system
101 Information processing system
102 Administrator terminal
103 Relationship information generating device
104 Relationship information storage device
109 Network
110 Node set acquiring unit
120 Classifying unit
200 Information processing system
210 Node set acquiring unit
300 Information processing system
320 Classifying unit
700 Computer
701 CPU
702 Storage unit
703 Storage device
704 Input unit
705 Output unit
706 Communication unit
707 Recording medium
810 Relationship information
811 Relationship information
812 Relationship information
813 Relationship information
820 Classification result
821 Classification result
822 Classification result
823 Classification result
830 Acquisition condition

The invention claimed is:

1. An information processing system comprising:
a memory storing instructions; and
one or more processors configured to execute the instructions to:
acquire, based on information regarding one or more relationships between a plurality of elements that constitute a system, for each of first elements to be classified, a set of second elements reachable to the first element via an arbitrary number of the relationships, the first elements and the second elements being included in the plurality of elements;
sort the second elements included in the set of the second elements based on a relationship between the first elements and the second elements;
set the set of the sorted second elements as a feature vector associated with the first elements; and
classify each of the first elements into one of a plurality of roles, based on the feature vectors, and output a classification result, the plurality of roles being roles of machines when the second elements include at least the machine or being roles of applications when the second elements include at least the applications,
wherein the roles of machines include at least a role of a machine in which a content is not transmitted to another machine, a role of a machine in which a content is transmitted to another machine, and a role of a machine in which the content is transmitted to a plurality of machines, and
the roles of applications include at least a role being an only one application to be executed exclusively, a role being a plurality of applications to be executed concurrently, a role being an application to be executed at a fixed time interval, and a role being an application to be executed each time when an init process is started,
wherein the one or more processors are further configured to execute the instructions to:
automatically detect a role change of at least one of the first elements, and
present the role change.

2. The information processing system according to claim 1, wherein the one or more processors are further configured to execute the instructions to:
classify the first element, based on the feature vector further including any of a number of elements in the set, the first element, an attribute of the second element, a distance between the first element and the second element, and a number of paths between the first element and the second element.

3. The information processing system according to claim 1, wherein the one or more processors are further configured to execute the instructions to:
sort the elements in the set, based on information regarding the relationship.

4. The information processing system according to claim 1, wherein the one or more processors are further configured to execute the instructions to:
acquire the set of second elements, while further using a direction of the relationship via which the second element reaches the first element, as a condition.

5. The information processing system according to claim 1, wherein the one or more processors are further configured to execute the instructions to:
acquire the set of second elements on condition of being reachable in terms of time in a case where there is a time limit regarding existence of either the second element or each of the relationships and each of the elements via which the second element reaches the first element.

6. The information processing system according to claim 1, wherein the one or more processors are further configured to execute the instructions to:
acquire a set of the second elements, while further using any of a distance between the first element and the second element, an attribute of the second element, an attribute of the element or the relationship via which the second element reaches the first element, as a condition.

7. The information processing system according to claim 1, wherein, the one or more processors are further configured to execute the instructions to:
classify, when the first element is an application, the application, further based on a relative relationship between existence periods of a plurality of the second elements, the plurality of the second element being processes generated from the application.

8. The information processing system according to claim 1, wherein, the one or more processors are further configured to execute the instructions to:
receive designation of an element to be classified.

9. The information processing system according to claim 1, wherein the one or more processors are further configured to execute the instructions to:
classify the first element, based on the feature vectors further including any of a number of elements in the set, the first element, an attribute of the second element, a distance between the first element and the second element, and a number of paths between the first element and the second element.

10. The information processing system according to claim 1, wherein the one or more processors are further configured to execute the instructions to:
sort the elements in the set, based on information regarding the relationship.

11. The information processing system according to claim 1, wherein the one or more processors are further configured to execute the instructions to:
acquire the set of second elements, while further using a direction of the relationship via which the second element reaches the first element, as a condition.

12. The information processing system according to claim 1, wherein the one or more processors are further configured to execute the instructions to:
acquire the set of second elements on condition of being reachable in terms of time in a case where there is a time limit regarding existence of either the second element or each of the relationships and each of the elements via which the second element reaches the first element.

13. The information processing system according to claim 2, wherein the one or more processors are further configured to execute the instructions to:
sort the elements in the set, based on information regarding the relationship.

14. The information processing system according to claim 2, wherein the one or more processors are further configured to execute the instructions to:
acquire the set of second elements, while further using a direction of the relationship via which the second element reaches the first element, as a condition.

15. The information processing system according to claim 2, wherein the one or more processors are further configured to execute the instructions to:
acquire the set of second elements on condition of being reachable in terms of time in a case where there is a time limit regarding existence of either the second element or each of the relationships and each of the elements via which the second element reaches the first element.

16. The information processing system according to claim 3, wherein the one or more processors are further configured to execute the instructions to:
acquire the set of second elements, while further using a direction of the relationship via which the second element reaches the first element, as a condition.

17. The information processing system according to claim 3, wherein the one or more processors are further configured to execute the instructions to:
acquire the set of second elements on condition of being reachable in terms of time in a case where there is a time limit regarding existence of either the second element or each of the relationships and each of the elements via which the second element reaches the first element.

18. A classifying method comprising:
acquiring, based on information regarding one or more relationships between a plurality of elements that constitute a system, for each of first elements to be classified, a set of second elements reachable to the first element via an arbitrary number of the relationships, the first elements and the second elements being included in the plurality of elements;
sorting the second elements included in the set of second elements based on a relationship between the first elements and the second elements;
setting the set of the sorted second elements as a feature vector associated with the first elements; and
classifying each of the first elements into one of a plurality of roles, based on the feature vectors, and outputting a classification result, the plurality of roles being roles of machines when the second elements include at least the machine or being roles of applications when the second elements include at least the application, wherein the roles of machines include at least a role of a machine in which a content is not transmitted to another machine, a role of a machine in which a content is transmitted to another machine, and a role of a machine in which the content is transmitted to a plurality of machines, and the roles of applications include at least a role being an only one application to be executed exclusively, a role being a plurality of applications to be executed concurrently, a role being an application to be executed at a fixed time interval, and a role being an application to be executed each time when an init process is started, automatically detecting a role change of at least one of the first elements, and presenting the role change.

19. A non-transitory computer readable storage medium storing a program causing a computer to execute processing of:

acquiring, based on information regarding one or more relationships between a plurality of elements that constitute a system, for each of first elements to be classified, a set of second elements reachable to the first element via an arbitrary number of the relationships, the first elements and the second elements being included in the plurality of elements;

sorting the second elements included in the set of second elements based on a relationship between the first elements and the second elements;

setting the set of the sorted second elements as a feature vector associated with the first elements; and classifying each of the first elements into one of a plurality of roles, based on the feature vectors, and outputting a classification result, the plurality of roles being roles of machines when the second elements include at least the machine or being roles of applications when the second elements include at least the application, wherein the roles of machines include at least a role of a machine in which a content is not transmitted to another machine, a role of a machine in which a content is transmitted to another machine, and a role of a machine in which the content is transmitted to a plurality of machines, and the roles of applications include at least a role being an only one application to be executed exclusively, a role being a plurality of applications to be executed concurrently, a role being an application to be executed at a fixed time interval, and a role being an application to be executed each time when an init process is started, automatically detecting a role change of at least one of the first elements, and presenting the role change.

* * * * *